United States Patent Office 2,777,800
Patented Jan. 15, 1957

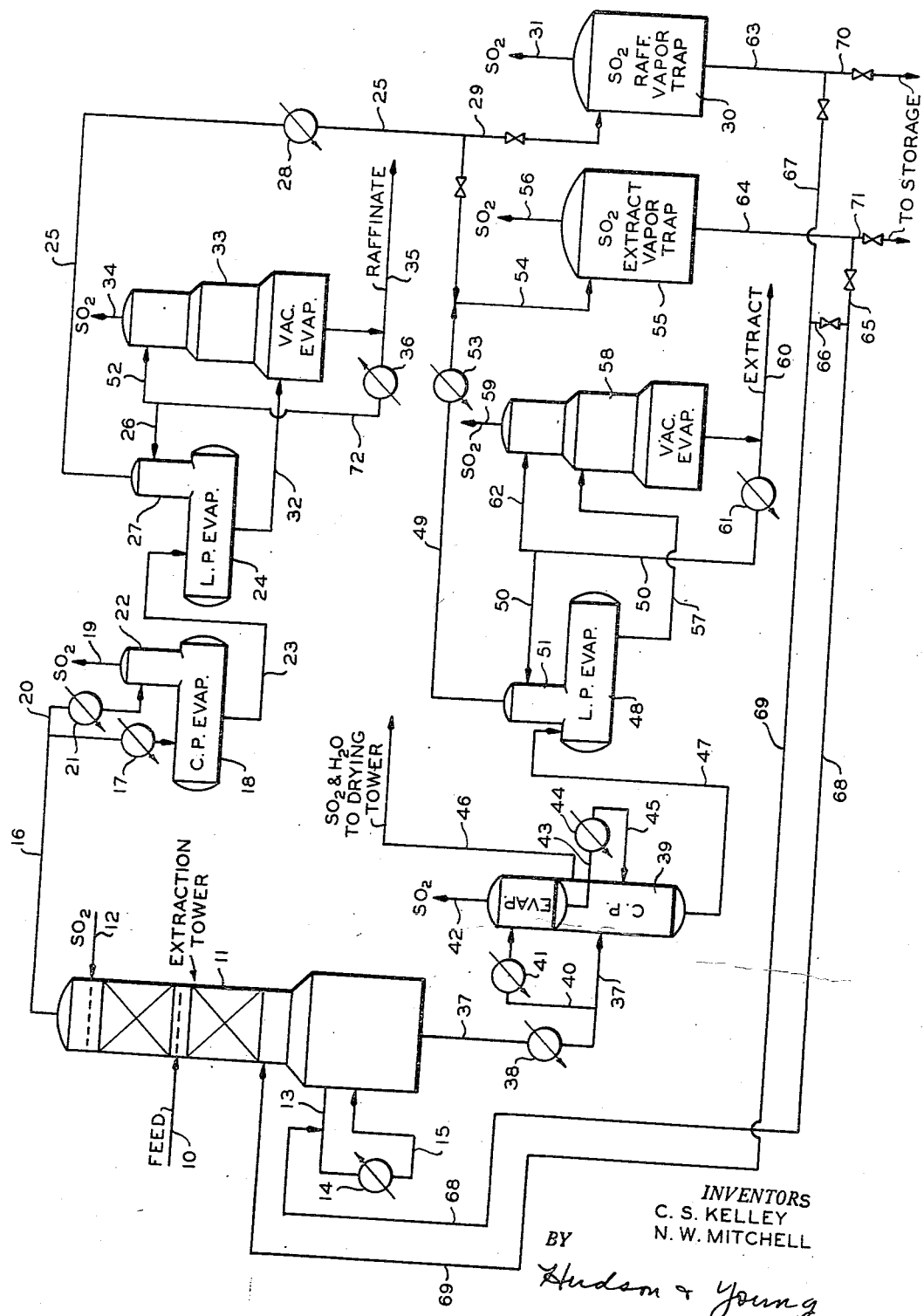

2,777,800

SOLVENT EXTRACTION OF HYDROCARBON OILS

Norris W. Mitchell and Carl S. Kelley, Bartlesville, Okla., assignors to Phillips Petroleum Company, a corporation of Delaware Application May 10, 1954, Serial No. 428,602

21 Claims. (Cl. 196—14.47)

This invention relates to the solvent extraction of hydrocarbon oils according to chemical types. In one aspect this invention relates to obtaining an anti-fouling oil by recovering a low-boiling oil from the distillation of at least one of a raffinate phase and an extract phase obtained in the solvent extraction of a hydrocarbon oil. In another aspect this invention relates to avoiding or removing deposits within or upon cooling, or other surfaces, of chilling means incorporated in a solvent extraction unit by introducing said low-boiling oil (anti-fouling oil) into the phase being chilled in said chilling means. In still another aspect this invention relates to obtaining a washing-reflux oil by recovering a low-boiling oil from the distillation of a raffinate phase and an extract phase obtained in the solvent extraction of a hydrocarbon oil. In still another aspect this invention relates to improving the separation of an oil into chemical types by introducing said washing-reflux oil into the extract phase in a solvent extraction tower. Other aspects will be evident from that which follows.

It has become conventional practice in the petroleum industry to employ solvent extraction to remove aromatics from cycle oils produced on catalytic or thermal cracking units. These aromatics can be cracked to yield gasolines of good quality. However, the gasoline yield is generally lower and the formation of fixed gases and carbon is generally higher than that from more saturated charge stocks. Also, in recent years the aromatics have become more valuable as a raw material for the production of improved carbon blacks and other chemicals.

As disclosed in co-pending application Serial No. 328,373, filed December 29, 1952, there exists a problem of wax deposition in the extract phase portion of the solvent extraction equipment when employing a solvent which is selective for aromatics. The problem, depending upon the solvent employed and the oil being extracted, can exist regardless of whether or not a temperature differential is maintained between the raffinate phase portion and the extract phase portion of the extraction tower. However, since the selectivity of a solvent for aromatics usually increases with decreasing temperature, it is common practice to chill the extract phase in solvent extraction systems. This chilling of extract phase, by reducing the solubility of the paraffinic components in the solvent, aggravates the problem. Waxy deposits frequently occur within or upon chilling or other surfaces in the zone in which the chilling is carried out.

The above referred to co-pending application provides and claims a method for preventing the formation of the above referred to waxy deposits and/or their removal after formation. Said method comprises introducing an anti-fouling oil into the extract phase before it is chilled. It has been found that if waxy deposits have already occurred their removal can be effected by employing an anti-fouling oil according to the said method.

We have now found that a highly satisfactory anti-fouling oil can be produced directly on a solvent extraction unit. Our anti-fouling oil comprises a low-boiling oil of controlled composition recovered from the raffinate phase and/or the extract phase. Since our anti-fouling oil is produced on the unit, the problem of contamination of raffinate and/or extract product by anti-fouling mediums from outside sources is completely eliminated. Additionally, the method of producing our anti-fouling oil makes possible certain operating advantages discussed below.

Thus, according to this invention, there is provided a method of operation of a solvent extraction system wherein, an oil to be extracted and a selective solvent are fed to a solvent extraction zone, a raffinate phase and an extract phase are removed from said zone, solvent recovery from said raffinate phase and from said extract phase is carried out by distillation, and fouling of the extract phase portion of said zone occurs, which comprises: permitting a portion of relatively low-boiling oil to distill overhead with said solvent in said distillation; separating said solvent from said low-boiling oil; and introducing said low-boiling oil into admixture with said extract phase in said zone, said low-boiling oil being adapted to prevent fouling of said zone.

In one embodiment of our invention, a mixture of the low-boiling oil recovered from the raffinate phase and the low-boiling oil recovered from the extract phase is admixed and employed as the anti-fouling oil.

In a second embodiment of our invention, only the low-boiling oil recovered from the raffinate phase is employed as an anti-fouling oil.

In a third embodiment only the low-boiling oil recovered from the extract phase is employed as an anti-fouling oil.

It is to be noted that in all embodiments of our invention the antifouling oil is produced on the unit. This very effectively eliminates all problems of contamination from an outside source. When the extract phase oil of the process is to be employed as a raw material for the manufacture of chemicals, it is important that it not be contaminated. When the anti-fouling oil is such that it may ultimately be in the oil recovered from the raffinate phase, and the raffinate oil is to be employed as catalytic cracking feed stock, the anti-fouling oil should not affect the catalytic cracking operation.

Usually the more paraffinic or more saturated oils are preferred as anti-fouling oils. Therefore, a presently preferred anti-fouling oil is a mixture containing more low-boiling oil from the raffinate phase than low-boiling oil from the extract phase. However, the actual composition of the preferred anti-fouling oil will be determined by such factors as, the nature of the oil being treated, the selective solvent being employed, nature of the products desired from the extraction unit, etc. As mentioned, it is one of the features of our invention that the composition of the anti-fouling oil can be easily and readily adjusted. Methods for changing said composition will be obvious to those skilled in the art from that which follows.

The attached drawing is a diagrammatic flow sheet of a solvent extraction system wherein the invention is employed. Referring now to the drawing. Oil to be treated is fed through line 10 into extraction tower 11 wherein it is contacted with liquid sulfur dioxide introduced through line 12. Tower 11 can be a bubble cap tower or can be packed with suitable contact packing such as Raschig rings, etc. A raffinate phase separates into the upper portion of said tower and an extract phase separates into the lower portion thereof. A temperature differential is maintained between the top and bottom of tower 11 by withdrawing a portion of extract phase through line 13 and circulating same through chiller 14 and line 15. An internal chilling coil can be employed alternatively in tower 11 is desired.

Raffinate phase is passed through line 16 and heater 17 into condenser pressure evaporator 18 wherein a portion of the sulfur dioxide is evaporated and removed through line 19. A portion of said raffinate phase is passed through line 20 and heater 21 into contact tower 22 wherein it contacts the outgoing sulfur dioxide vapors to remove entrained oil, etc., from said vapors. Partially stripped raffinate phase is passed through line 23 into low pressure evaporator 24 wherein further sulfur dioxide is evaporated and taken overhead through line 25. Sufficient finished raffinate oil can be introduced through line 26 into contact tower 27 as reflux to prevent low-boiling raffinate oil from distilling overhead with the sulfur dioxide vapors. However, according to the invention the reflux on contact tower 27 is eliminated or decreased to permit a desired quantity, of desired boiling range, low-boiling raffinate oil to distill over with the sulfur dioxide vapors. Said sulfur dioxide vapors and said low-boiling oil are passed through condenser 28 and line 29 into trap 30 wherein a separation is effected and sulfur dioxide vapors are removed through line 31. Partially stripped raffinate phase is passed from low pressure evaporator 24 through line 32 into vacuum evaporator 33 wherein the remaining sulfur dioxide is removed from the raffinate product oil and withdrawn through line 34. Finished raffinate product is withdrawn through line 35 to storage. A portion of said finished raffinate can be passed through cooler 36, line 72 and line 26 for reflux on contact tower 27 as described and through line 52 as reflux on vacuum evaporator 33.

Extract phase is withdrawn from tower 11 and passed through line 37 and heater 38 into the lower section of condenser pressure evaporator 39. A portion of said extract phase is passed through line 40 and heater 41 into the upper section of evaporator 39 and sulfur dioxide is removed overhead therefrom through line 42. Bottoms from said upper section are withdrawn through line 43, passed through heater 44 and line 45 into said lower section. Sulfur dioxide and water vapor are removed from said lower section through line 46 to a drying tower (not shown). Partially stripped extract phase is passed through line 47 into low pressure evaporator 48 wherein further sulfur dioxide is evaporated and taken overhead through line 49. Sufficient finished extract oil can be introduced through line 50 into contact tower 51 as reflux to prevent low-boiling extract oil from distilling overhead with the sulfur dioxide vapors. However, as done on the raffinate low pressure evaporator and in accordance with the invention, the reflux on contact tower 51 is eliminated or decreased to permit a desired quantity, of desired boiling range, low-boiling extract oil to distill over with the sulfur dioxide vapors. Said sulfur dioxide vapors and said low-boiling oil are passed through condenser 53 and line 54 into trap 55 wherein a separation is effected and sulfur dioxide vapors are removed through line 56. Partially stripped extract phase is passed from low pressure evaporator 48 through line 57 into vacuum evaporator 58 wherein the remaining sulfur dioxide is removed from the extract product oil and withdrawn through line 59. Finished extract product oil is withdrawn through line 60 to storage. A portion of the finished extract oil is returned through cooler 61, line 50 and line 62 as reflux for vacuum evaporator 58. As described a portion of said extract product oil can be employed as reflux on contact tower 51.

In one embodiment of the invention, the low-boiling raffinate oil in trap 30 is withdrawn via line 63, passed through lines 67 and 66 and mixed with the low-boiling extract oil (withdrawn from trap 55 via lines 64 and 65) in line 68. Said mixture is then introduced into line 13 and admixed with extract phase therein before said extract phase is chilled. Said mixture of low-boiling oils is effective as an anti-fouling oil and prevents waxy deposits in the tubes of chiller 14. While any desired ratio of raffinate oil component to extract oil component can be employed, it is generally preferred to employ a mixture, the major portion (i. e., more than 50 percent) of which is low-boiling raffinate oil component. If desired, said low-boiling oils from traps 30 and 55 can be mixed in line 69 by means of the manifold arrangement and passed through said line 69 to tower 11 as shown. Any build-up of low-boiling oils in traps 30 and 55 can be removed through lines 70 and 71 respectively.

In other embodiments of the invention, either the low-boiling raffinate oil alone, or the low-boiling extract oil alone, can be passed through either lines 68 or 69 as desired.

When said low-boiling oils are employed as anti-fouling oils, as described, they are added to the extract phase in an amount effective to prevent any substantial deposition of wax within the chiller zone. The amount employed will generally be less than 15 weight percent of the extract oil yield, preferably not more than about 10 weight percent.

Operating conditions on extraction tower 11 will vary according to the oil being treated, the selective solvent being employed, and the degree of separation desired as will be understood by those skilled in the art. When treating a cycle oil having a boiling range of approximately 380 to 750° F., with liquid sulfur dioxide, the top tower temperature will generally be 60° F. and can range from 50 to 75° F. The bottom tower temperature will generally be approximately 50° F. and can range from 30 to 70° F. Pressure, of course, will depend upon temperature and is usually maintained at approximately 35 pounds per square inch gauge.

In the portion of the solvent recovery system wherein solvent is recovered from the raffinate phase, the condenser pressure evaporator is usually operated at a temperature of approximately 300° F., and a pressure of approximately 106 pounds per square inch gauge. The low pressure evaporator is usually operated at a temperature of approximately 315° F., and at a pressure substantially atmospheric. As mentioned above, the amount and the boiling range of the low-boiling oil taken overhead from the low pressure evaporator can be controlled by the temperature on said evaporator and the amount and temperature of the reflux supplied to the contact tower of said evaporator. The vacuum evaporator is usually operated at a temperature of approximately 350° F. and at a pressure of approximately 75 mm. Hg absolute. Obviously, operating conditions for all three of the said evaporators will be determined by the nature of the oil being treated and the type of selective solvent being employed. In the portion of the solvent recovery system wherein solvent is recovered from the extract phase the top portion of the condenser pressure evaporator is usually operated at a temperature of 150° F., and a pressure of 130 pounds per square inch gauge. The bottom portion of said condenser pressure evaporator is usually operated at a temperature of 300° F., and at a pressure of 110 pounds per square inch gauge. The low pressure evaporator is usually operated at a temperature of 300° F., and at a pressure substantially atmospheric. The amount and boiling range of the low-boiling oil removed overhead from said low pressure evaporator can be controlled similarly as in the low pressure evaporator in the raffinate portion of the system. The vacuum evaporator is usually operated at a temperature of 350° F., and at a pressure of 75 mm. Hg absolute.

Obviously, actual operating conditions for all three of said evaporators will be determined by the nature of the oil being treated and the selective solvent being employed.

In addition to the advantages already enumerated for our invention, there are substantial operating advantages. For example, the elimination or decrease in the amount of reflux supplied to the low pressure evaporators reduces the load on coolers 36 and 61. Also, the amount of low-boiling oil taken overhead from the two low pressure evaporators reduces the load on the two vacuum evaporators by a corresponding amount. In those places wherein the load on the equipment has been reduced, smaller equipment can be employed or more efficient operation will result, particularly in the case of the vacuum evaporators.

The following examples illustrate the operation of one embodiment of our invention. Example I illustrates a typical operation of a solvent extraction unit when no anti-fouling oil is employed. Example II illustrates a typical operation of a solvent extraction unit employing an anti-fouling oil produced according to our invention.

EXAMPLE I 800 barrels per hour of a cycle oil produced on a catalytic cracking unit and having a boiling range of approximately 400 to 720° F., is charged to a solvent extraction tower at a temperature of approximately 60° F. In said tower said oil is contacted with 600 barrels per hour of liquid sulfur dioxide to form a raffinate phase occupying the upper portion of said tower and an extract phase occupying the lower portion of said tower. The upper portion of said tower is maintained at approximately 60° F. The lower portion of said tower is maintained at approximately 45° F. by withdrawal of a portion of said extract phase from the tower at a point near the bottom thereof and circulating same through the tubes of a chiller. Wax deposition occurs in the tubes of said chiller greatly reducing its efficiency and limiting the amount which the bottom tower temperature can be lowered. The temperature differential across the chiller tube bundle is 10° F. Raffinate phase and extract phase are withdrawn separately from said tower and solvent recovered therefrom, in a separate three-stage evaporation system for each. Reflux is employed on the condenser pressure evaporators and the low pressure evaporators to prevent low-boiling raffinate oil and low-boiling extract oil from distilling overhead with the solvent. The yield of raffinate oil is 580 barrels per hour or 73 liquid volume percent of the charge and the yield of extract oil is 220 barrels per hour or 27 liquid volume percent of the charge.

EXAMPLE II 800 barrels per hour of the cycle oil employed in Example I is charged to the solvent extraction tower at a temperature of approximately 60° F. The oil is contacted with 600 barrels per hour of liquid sulfur dioxide to form a raffinate phase and an extract phase as described. The upper portion of the said tower is maintained at approximately 60° F. The lower portion of said tower is maintained at approximately 35° F. by chilling a portion of said extract phase as described. Raffinate phase and extract phase are withdrawn separately from said tower and solvent recovered from each said phase in a separate three-stage evaporation system. The reflux which is employed on the low pressure evaporator in both systems is regulated to permit a desired quantity of low-boiling oil to distill over with the solvent. 15 barrels per hour of low-boiling raffinate oil are permitted to distill overhead with the sulfur dioxide from the raffinate phase low pressure evaporator. 10 barrels per hour of low-boiling extract oil are permitted to distill overhead with the sulfur dioxide from the extract phase low pressure evaporator. The low-boiling oil from the raffinate phase has an approximate boiling range of 390 to 450° F. The low-boiling oil from the extract phase has an approximate boiling range of 380 to 450° F. Said low-boiling oils are separated from sulfur dioxide in a vapor trap and blended together to form 25 barrels per hour of an anti-fouling oil comprised of 60 percent by volume low-boiling raffinate oil and 40 percent by volume low-boiling extract oil. Wax deposition within the tubes of said chiller is avoided by introducing into the withdrawn portion of extract phase, before it is chilled, the said 25 barrels per hour of anti-fouling oil. When employing the said low-boiling oils as described, the temperature differential across the chiller tube bundle is 15° F., the yield of raffinate oil is 76 liquid volume percent of the charge; and the yield of extract oil is 24 liquid volume percent of the charge.

Table I below summarizes the results of Examples I and II.

Table I

TYPICAL OPERATING CONDITIONS—$SO_2$ EXTRACTION OF CYCLE OIL

|  | Without Introducing Anti-Fouling Oil to Extract Phase (Example I) | With Introduction of Anti-Fouling Oil to Extract Phase (Example II) |
|---|---|---|
| Oil Charge Rate, B./H.[1] | 800 | 800 |
| $SO_2$ Charge Rate, B./H. | 600 | 600 |
| Extract circulation Rate to Chiller, B./H. | 600 | 600 |
| Raffinate Yield, B./H. | 580 | 610 |
| L. V. percent[2] of charge | 73 | 76 |
| Extract Yield, B./H. | 220 | 190 |
| L. V. percent of charge | 27 | 24 |
| Anti-Fouling Oil Charge, B./H. | 0 | 25 |
| Tower Temperatures: |  |  |
| Top, ° F. | 60 | 60 |
| Bottom, ° F. | 45 | 33 |
| Extract from chiller, ° F. | 42 | 30 |
| Temperature Differential across Chiller Bundle, ° F. | 15 | 8 |

[1] B./H.=barrels per hour.
[2] L. V. percent=liquid volume percent.

The increased yield of raffinate oil and the decreased temperature differential across the chiller tube bundle in Example II should be noted.

While the invention has been described in connection with a system employing liquid sulfur dioxide to selectively extract cycle oils, it should not be limited to this one embodiment. The invention is applicable to systems wherein oils other than cycle oils are extracted with liquid sulfur dioxide or other normally gaseous solvents including hydrocarbons such as propane. Normally liquid selective solvents can also be employed depending upon the relative boiling points of the solvent and the oil to be treated.

In the above examples, the invention has been described as employing continuous admixture of the low-boiling oil with the extract phase. Actually the introduction of the low-boiling oils can be continuous or intermittent. Present preferred practice is to employ continuous introduction of the low-boiling oil. However, since the low-boiling oil will effect removal of wax already deposited, intermittent introduction of the low-boiling oil can be employed.

An added feature of the invention is that the low-boiling oils recovered from the raffinate phase and the extract phase as described above can be admixed in a variable ratio to give a washing-reflux oil. A washing-reflux oil is one which combines the functions of a wash oil and a reflux oil. When our washing-reflux oil is added to the extract phase in a solvent extraction tower the extract component of said oil causes precipitation of heavy paraffinic oils from said extract phase, and the raffinate component washes said precipitated heavy paraffinic oils and other heavy paraffinic oils from said extract phase.

It is presently believed that the close proximity of the two types of oil in the admixture introduced into the extract phase is responsible for the superior results which can be obtained over the use of the two types of oil separately for its own function. In other words, the extract component causes precipitation of droplets of paraffinic oils and a droplet of raffinate component, being immediately adjacent, immediately absorbs, dissolves or coalesces with said precipitated paraffinic oil and carries it out of the extract phase. The fact that the extract component and the raffinate component of our washing-reflux oil are both low-boiling oils makes them eminently suitable for this purpose. The light low-boiling extract component is more soluble in the solvent than the heavy paraffinic oils and readily displaces the latter from the solvent. The light low-boiling raffinate component has a high solvent power for other paraffinic oils and also a relatively low specific gravity. The high solvent power enables droplets of raffinate component to readily dissolve, absorb or coalesce with precipitated paraffinic oil droplets and the low specific gravity enables said combined droplets to rise rapidly through and out of the extract phase. While any desired ratio of the two said low-boiling oils can be employed as our washing-reflux oil, it is generally preferable, when so employing said oils, to employ a mixture, the major portion (i. e., more than 50 percent) of which is low-boiling extract oil component. This added feature of our invention is particularly applicable to those situations wherein fouling of the solvent extraction zone does not occur.

Reasonable variation and modification are possible within the scope of the foregoing disclosure, the drawing and the appended claims to the invention the essence of which is that in the operation of a solvent extraction system, wherein an oil is extracted with a selective solvent to form an extract phase and a raffinate phase and the solvent is recovered from each of said phases by distillation, a portion of relatively low-boiling oil is permitted to distill overhead with the solvent in said distillation, said low-boiling oil is recovered and introduced, continuously or intermittently, into admixture with extract phase in said unit to avoid fouling, by solids deposition, of the extraction zone.

We claim:

1. In the operation of a selective solvent extraction system in which; an oil to be extracted and a selective solvent are fed to a solvent extraction zone; a raffinate phase and an extract phase are removed from said zone; solvent recovery from said raffinate phase and from said extract phase is carried out by distillation; fouling of the extract phase portion of said zone occurs; the improvement which comprises: permitting a portion of relatively low-boiling components of said oil to distill overhead with said solvent in said distillation; separating said solvent from said low-boiling oil; and introducing said low-boiling oil into admixture with said extract phase in said zone, said low-boiling oil being adapted to prevent fouling of said zone.

2. In the operation of a selective solvent extraction system in which an oil to be extracted and a normally gaseous selective solvent are fed to a solvent extraction zone; a raffinate phase and an extract phase are removed from different regions of said zone; solvent recovery from said raffinate phase and from said extract phase is carried out by distillation; a temperature differential is maintained between said regions of said zone, causing fouling of a region of operation in which the temperature is lowered; the improvement which comprises: permitting a portion of relatively low-boiling components of said oil to distill overhead with said solvent in said distillation; separating said solvent from said low-boiling oil; introducing said low-boiling oil into admxture with said extract phase before its temperature is lowered to a substantial extent, said low-boiling oil being adapted to prevent fouling of the said region in which the temperature is lowered; and then lowering the temperature of said admixture.

3. An operation according to claim 2 in which the region in which the temperature of the extract phase is lowered is separate from the solvent extraction zone.

4. In the operation of a selective solvent extraction system in which an oil to be extracted and a normally gaseous selective solvent are fed to a solvent extraction zone; a raffinate phase and an extract phase are removed from different regions of said zone; solvent recovery from said raffinate phase and from said extract phase is carried out by distillation; a temperature differential is maintained between said regions of said zone, causing fouling of a region of operation in which the temperature is lowered; the improvement which comprises: permitting a portion of relatively low-boiling components of said oil to distill overhead with said solvent from said extract phase in said distillation; separating said solvent from said low-boiling oil; introducing said low-boiling oil into admixture with said extract phase before its temperature is lowered to a substantial extent, said low-boiling oil being adapted to prevent fouling of the said region in which the temperature is lowered; and then lowering the temperature of said admixture.

5. In the operation of a selective solvent extraction system in which an oil to be extracted and a normally gaseous selective solvent are fed to a solvent extraction zone; a raffinate phase and an extract phase are removed from different regions of said zone; solvent recovery from said raffinate phase and from said extract phase is carried out by distillation; a temperature differential is maintained between said regions of said zone, causing fouling of a region of operation in which the temperature is lowered; the improvement which comprises: permitting a portion of relatively low-boiling components of said oil to distill overhead with said solvent from said raffinate phase in said distillation; separating said solvent from phase in said low-boiling oil; introducing said low-boiling oil into admixture with said extract phase before its temperature is lowered to a substantial extent, said low-boiling oil being adapted to prevent fouling of the said region in which the temperature is lowered; and then lowering the temperature of said admixture.

6. A process for the removal of aromatic constituents from an oil comprising aromatic constituents and non-aromatic constituents which comprises: feeding said oil to an intermediate portion of a selective solvent extraction zone; therein contacting said oil with liquid sulfur dioxide solvent, thus producing a raffinate phase rich in said non-aromatic constituents at an upper portion of said zone and an extract phase rich in aromatic constituents at a lower portion of said zone; maintaining a temperature differential between said upper portion and said lower portion of said zone, by chilling at least a portion of the extract phase in the lower portion of said zone causing fouling due to wax deposition; recovering solvent from said raffinate phase and from said extract phase by distillation; permitting a portion of relatively low-boiling components of said oil to distill overhead in said distillation; separating said solvent from said low-boiling oil; introducing said low-boiling oil into admixture with said extract phase before its temperature is lowered to a substantial extent, said low-boiling oil being adapted to prevent fouling of the said lower portion of said zone in which the temperature is lowered; and then lowering the temperature of said admixture.

7. A process according to claim 6 wherein said extract phase in the lower portion of said zone is chilled by removing a portion thereof and passing the same through a separate chilling zone and then returning the thusly chilled portion of extract phase to said lower portion of said extraction zone and wherein said low-boiling oil is introduced into and admixed with the said removed portion of extract phase immediately before it is passed to said separate chilling zone.

8. A process according to claim 6 wherein said low-boiling oil is a portion of said oil normally recovered from said extract phase.

9. A process according to claim 6 wherein said low-boiling oil is a portion of said oil normally recovered from said raffinate phase.

10. A process in which a cycle oil containing paraffins and aromatics obtained from a catalytic cracking of a hydrocarbon oil is treated to remove aromatics therefrom which comprises: passing said oil at a temperature in the approximate range of 55–60° F. into an intermediate portion of a solvent extraction zone; in said zone contacting said oil with liquid sulfur dioxide at a temperature of approximately 60° F. to produce an upper raffinate phase rich in paraffinic constituents and a lower extract phase rich in aromatics; recovering solvent from said raffinate phase and from said extract phase by distillation, said distillations being carried out in three stages each, of decreasing pressure; permitting a portion of relatively low-boiling components of said oil to distill overhead in a second stage of said distillation; separating solvent from low-boiling oil; removing at least a portion of said extract phase from said solvent extraction zone and passing same to a chilling zone separate from but associated with said solvent extraction zone; admixing with said removed portion of extract phase immediately before chilling an amount of said low-boiling oil effective to prevent wax deposition in said chiller zone and said extraction zone; chilling said admixture of extract phase and low-boiling oil to a temperature of approximately 30° F. in a proportion effective to maintain an extraction zone bottom temperature of approximately 30° F.; and recovering paraffins from said raffinate phase and aromatics from said extract phase as products of the process.

11. A process according to claim 10 wherein said low-boiling oil is a portion of said oil normally recovered from said extract phase.

12. A process according to claim 10 wherein said low-boiling oil is a portion of said oil normally recovered from said raffinate phase.

13. In the operation of a selective solvent extraction system in which; an oil to be extracted and a selective solvent are fed to a solvent extraction zone; a raffinate phase and an extract phase are removed from said zone; solvent recovery from said raffinate phase and from said extract phase is carried out by distillation; the improvement which comprises: permitting a portion of relatively low-boiling components of said oil to distill overhead with said solvent in said distillation; separating said solvent from said low-boiling oil; admixing low-boiling oil from said raffinate phase with low-boiling oil from said extract phase in a variable ratio to form an admixture adapted as a washing-reflux oil, said ratio being determined by the extent of washing action desired and the extent of refluxing desired, and vice versa; and introducing said washing-reflux oil into said extract phase in said zone, the extract portion of said washing-reflux oil being adapted to reflux said extract phase causing precipitation of heavy paraffinic oils from said extract phase and the raffinate portion of said washing-reflux oil being adapted to wash said precipitated heavy paraffins and other heavy paraffinic oils from said extract phase.

14. In the separation of an oil into chemical types by solvent extraction in which, an extract phase and a raffinate phase are obtained and solvent is recovered from at least one of said phases by distillation, the steps comprising: removing from said distillation together with said solvent a portion of the low-boiling components of said oil; separating said solvent from said low-boiling components of said oil; and returning said low-boiling components to an extract phase of a solvent extraction system.

15. A process according to claim 14 wherein said low-boiling components are a portion of said oil normally recovered from said raffinate phase.

16. A process according to claim 14 wherein said low-boiling components are a portion of said oil normally recovered from said extract phase.

17. In the separation of an oil into chemical types by solvent extraction in which, an extract phase and a raffinate phase are obtained in a solvent extraction zone, fouling of the extract phase portion of said zone occurs, and solvent is recovered from at least one of said phases by distillation, the steps comprising: removing from said distillation together with said solvent a portion of the low-boiling components of said oil; separating said solvent from said low-boiling components of said oil; and returning said low-boiling components to said extract phase in said zone in an amount sufficient to prevent fouling of said zone.

18. A process according to claim 17 wherein said low-boiling components are a portion of said oil normally recovered from said raffinate phase.

19. A process according to claim 17 wherein said low-boiling components are a portion of said oil normally recovered from said extract phase.

20. A process according to claim 14, wherein low-boiling components of said oil, normally recovered from said raffinate phase, and low-boiling components of said oil, normally recovered from said extract phase, are mixed to form said low-boiling components returned to said extract phase of said solvent extraction system.

21. A process according to claim 17, wherein low-boiling components of said oil, normally recovered from said raffinate phase, and low-boiling components of said oil, normally recovered from said extract phase, are mixed to form said low-boiling components returned to said extract phase of said solvent extraction system.

References Cited in the file of this patent

UNITED STATES PATENTS

| | | |
|---|---|---|
| 2,139,392 | Tijmstra | Dec. 6, 1938 |
| 2,162,963 | McKittrick | June 20, 1939 |
| 2,176,429 | Kiersted | Oct. 17, 1939 |
| 2,633,448 | Neuworth | Mar. 31, 1953 |
| 2,656,301 | Findlay | Oct. 20, 1953 |